United States Patent
Lin (10) Patent No.: US 11,343,020 B2
(45) Date of Patent: May 24, 2022

(54) DATA COMPRESSION METHOD AND DEVICE

(71) Applicant: Guangdong OPPO Mobile Telecommunications Corp., Ltd., Guangdong (CN)

(72) Inventor: Yanan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 552 days.

(21) Appl. No.: 16/338,685

(22) PCT Filed: Nov. 10, 2017

(86) PCT No.: PCT/CN2017/110520
§ 371 (c)(1),
(2) Date: Apr. 1, 2019

(87) PCT Pub. No.: WO2019/090710
PCT Pub. Date: May 16, 2019

(65) Prior Publication Data
US 2021/0328722 A1    Oct. 21, 2021

(51) Int. Cl.
*H04L 1/16*       (2006.01)
*H04W 72/04*   (2009.01)
*H04L 1/18*       (2006.01)

(52) U.S. Cl.
CPC .......... *H04L 1/1621* (2013.01); *H04L 1/1896* (2013.01); *H04W 72/0413* (2013.01); *H04W 72/0466* (2013.01)

(58) Field of Classification Search
CPC combination set(s) only.
See application file for complete search history.

(56) References Cited

U.S. PATENT DOCUMENTS

2012/0106408 A1*   5/2012   Papasakellariou ........ H04L 5/14
                                                                       370/280
2018/0098316 A1*   4/2018   Wang ................ H04W 72/0446
(Continued)

FOREIGN PATENT DOCUMENTS

CN    104885499 A    9/2015
CN    107113121 A    8/2017
(Continued)

OTHER PUBLICATIONS

3GPP TSG RAN WG1 Meeting #90bis; Prague, CZ, Oct. 9-13, 2017; R1-1718861.
(Continued)

*Primary Examiner* — Christopher M Crutchfield
*Assistant Examiner* — Tito Q Pham
(74) *Attorney, Agent, or Firm* — Young Basile Hanlon & MacFarlane, P.C.

(57) ABSTRACT

A radio communication method and device are provided. The method includes: performing a compression processing on uplink control information to be transmitted in a target time unit, wherein the compression processing includes a compression processing performed on Coding Block Group (CBG)-based feedback response information included in the uplink control information; and transmitting the uplink control information after the compression processing in the target time unit.

14 Claims, 4 Drawing Sheets

(56) References Cited

U.S. PATENT DOCUMENTS

| | | | | |
|---|---|---|---|---|
| 2019/0363840 A1* | 11/2019 | Wang | .................... | H04L 1/1822 |
| 2020/0119856 A1* | 4/2020 | Zhou | .................... | H04L 1/1621 |
| 2020/0136750 A1* | 4/2020 | Baldemair | ............ | H04L 1/1812 |
| 2020/0213044 A1* | 7/2020 | Peng | .................... | H04L 1/1621 |
| 2020/0220666 A1* | 7/2020 | Xue | ...................... | H04L 1/1861 |
| 2020/0295878 A1* | 9/2020 | Choi | ................. | H04W 72/1273 |
| 2021/0014012 A1* | 1/2021 | Park | ...................... | H04L 1/1896 |

FOREIGN PATENT DOCUMENTS

| | | | | |
|---|---|---|---|---|
| CN | 201710910258.9 | * | 9/2017 | ........... H04L 5/0055 |
| EP | 3094091 A1 | | 11/2016 | |

OTHER PUBLICATIONS

3GPP TSG RAN WG1#90bis; Prague, Czech Republic, Oct. 9-13, 2017; Agenda item 7.3.4 2; R1-1718781.

3GPP TSG RAN WG1 Meeting #90bis; Prague, CZ, Oct. 9-13, 2017; R1-1719171.

Fujitsu: "Discussion on HARQ-ACK feedback for DL CBG based (re)transmission" 3GPP TSG RAN WG1 Meeting #90bis; R1-1717720 Prague, Czech Republic, Oct. 9-13, 2017, XP051340905.

ZTE et al.: "HARQ-ACK Multiplexing and Bundling" 3GPP TSG RAN WG1 Meeting 90bis; R1-1717041 Prague, CZ, Oct. 9-13, 2017, XP051340233.

Extended European search report issued in corresponding European application No. 17923978.5 dated Sept. 2 5, 2019.

* cited by examiner

FIG. 6

DATA COMPRESSION METHOD AND DEVICE

CROSS-REFERENCE TO RELATED APPLICATION(S)

This application is a 371 application of International Application No. PCT/CN2017/110520, filed on Nov. 10, 2017, the entire disclosure of which is hereby incorporated by reference.

TECHNICAL FIELD

The present disclosure relates to the field of communication, and more particularly, to a radio communication method and device

BACKGROUND

In a New Radio (NR) system, Coding Block Group (CBG)-based feedback and retransmission can be used to improve transmission efficiency, wherein one coding block group CBG can contain at least one coding block, and one transmission block contains at least one coding block group. The terminal can feed back acknowledgement (ACK)/Non-acknowledgement (NACK) for each CBG independently (i.e., CBG level ACK/NACK), and at this time retransmission can be scheduled based on the CBG To ensure a demodulation performance of the uplink control channel, for different terminals the network side may configure a maximum number of bits of uplink control signaling which can be carried by a terminal. For a terminal configured as CBG-based transmission, when the uplink control information to be transmitted exceeds the maximum number of bits configured by the network side, there is no definite scheme on how the terminal transmits the uplink control information

SUMMARY

Implementations of the present disclosure provide a radio communication method and device.

In a first aspect, a radio communication method is provided. The method includes:

performing a compression processing on uplink control information to be transmitted in a target time unit, wherein the compression processing includes a compression processing performed on Coding Block Group (CBG)-based feedback response information included in the uplink control information;

transmitting the uplink control information after the compression processing in the target time unit.

In combination with the first aspect, in one possible implementation of the first aspect, before the compression processing is performed on the uplink control information to be transmitted in the target time unit, the method further includes:

determining that a number of bits to be transmitted in the uplink control information is greater than a first value.

In combination with the first aspect or any one of the above possible implementations, in another possible implementation of the first aspect, performing the compression processing on the uplink control information to be transmitted in the target time unit includes:

performing the compression processing on the uplink control information according to the first value to make a number of bits to be transmitted in the uplink control information after the compression processing less than or equal to the first value.

In combination with the first aspect or any one of the above possible implementations, in another possible implementation of the first aspect, performing the compression processing on the uplink control information includes:

performing the compression processing on CBG-based feedback response information corresponding to a single transmission block respectively.

In combination with the first aspect or any one of the above possible implementations, in another possible implementation of the first aspect, performing the compression processing on the CBG-based feedback response information corresponding to the single transmission block respectively includes:

performing the compression processing on CBG-based feedback response information corresponding to different transmission blocks by using a same compression mode, wherein the same compression mode includes a same compression ratio and/or same compression times.

In combination with the first aspect or any one of the above possible implementations, in another possible implementation of the first aspect, performing the compression processing on the CBG-based feedback response information corresponding to the single transmission block respectively includes:

performing the compression processing on the CBG-based feedback response information corresponding to the single transmission block in turn according to a compression priority of the single transmission block.

In combination with the first aspect or any one of the above possible implementations, in another possible implementation of the first aspect, wherein performing the compression processing on the CBG-based feedback response information corresponding to the single transmission block respectively includes:

performing at least one processing on the CBG-based feedback response information in turn till a predetermined condition is satisfied, wherein information used in an (M+1)th processing is feedback response information after an Mth processing, and the M is an integer greater than or equal to 0.

In combination with the first aspect or any one of the above possible implementations, in another possible implementation of the first aspect, performing at least one processing on the CBG-based feedback response information in turn includes:

performing the (M+1)th processing on the feedback response information after the Mth processing to make a number of bits of the feedback response information after the (M+1)th processing less than or equal to a second value; wherein, the second value is obtained by ceiling a maximum number of coding block groups which can be included in the transmission block divided by a third value, wherein the third value is equal to a value obtained by multiplying a first compression ratio adopted in the (M+1)th processing by a second compression ratio adopted in the Mth processing; or, the second value is obtained by ceiling a number of bits corresponding to multiple coding block groups before the (M+1)th processing divided by a third compression ratio; or, the second value is obtained by ceiling the maximum number of coding block groups which can be included in the transmission block divided by a fourth value, wherein the fourth value is an (M+1)th power of a fourth compression ratio;

wherein the compression ratio is a ratio of a number of bits before a compression to a number of bits after the compression.

In combination with the first aspect or any of the above possible implementations, in another possible implementation of the first aspect, a value of the first compression ratio, a value of the second compression ratio, a value of the third compression ratio, or a value of the fourth compression ratio is a constant or configured by a network side.

In combination with the first aspect or any one of the above possible implementations, in another possible implementation of the first aspect, performing at least one processing on the CBG-based feedback response information in turn includes:

performing the (M+1)th processing by using the feedback response information after the Mth processing, wherein the (M+1)th processing includes performing a combining processing on valid bits of the feedback response information after the Mth processing to obtain valid bits of feedback response information after the (M+1)th processing.

In combination with the first aspect or any one of the above possible implementations, in another possible implementation of the first aspect, performing the (M+1)th processing by using the feedback response information after the Mth processing includes:

performing the combining processing on adjacent valid bits in the valid bits of the feedback response information after the Mth processing to obtain the valid bits of the feedback response information after the (M+1)th processing.

In combination with the first aspect or any one of the above possible implementations, in another possible implementation of the first aspect, performing the (M+1)th processing by using the feedback response information after the Mth processing includes:

grouping the valid bits of the feedback response information after the Mth processing according to a compression ratio of the (M+1)th processing, wherein a difference between different groups in the number of valid bits is not greater than 1; and performing the combining processing in groups.

In combination with the first aspect or any one of the above possible implementations, in another possible implementation of the first aspect, the number of valid bits of the feedback response information after the Mth processing is greater than a second value.

In combination with the first aspect or any one of the above possible implementations, in another possible implementation of the first aspect, performing the at least one processing on the CBG-based feedback response information in turn includes:

performing the (M+1)th processing by using the feedback response information after the Mth processing, wherein the valid bits in the feedback response information after the Mth processing are mapped to the valid bits in the feedback response information after the (M+1)th processing.

In combination with the first aspect or any one of the above possible implementations, in another possible implementation of the first aspect, the number of valid bits of the feedback response information after the Mth processing is not greater than a second value.

In combination with the first aspect or any one of the above possible implementations, in another possible implementation of the first aspect, performing the at least one processing on the CBG-based feedback response information in turn includes:

after performing at least one processing on the CBG-based feedback response information, when a current number of bits to be transmitted in the uplink control information is less than or equal to the second value, filling the feedback response information with placeholder information to make a number of bits of the filled feedback response information equal to the second value.

In combination with the first aspect or any one of the above possible implementations, in another possible implementation of the first aspect, when the CBG-based feedback response information is processed for multiple times, a compression ratio adopted for each processing is the same.

In combination with the first aspect or any one of the above possible implementations, in another possible implementation of the first aspect, performing the compression processing on the CBG-based feedback response information corresponding to the single transmission block respectively includes:

performing a processing on the CBG-based feedback response information by using a target compression ratio, wherein after performing the processing on the CBG-based feedback response information by using the target compression ratio, a predetermined condition is satisfied.

In combination with the first aspect or any one of the above possible implementations, in another possible implementation of the first aspect, performing the compression processing on the CBG-based feedback response information corresponding to the single transmission block respectively includes:

estimating a number of bits to be transmitted in the uplink control information obtained after performing the processing on the feedback response information by using each available compression ratio in turn till the predetermined condition is satisfied; and determining the compression ratio adopted when the predetermined condition is satisfied as the target compression ratio.

In combination with the first aspect or any one of the above-mentioned possible implementations, in another possible implementation of the first aspect, estimating the number of the bits to be transmitted in the uplink control information obtained after performing the processing on the feedback response information by using each available compression ratio in turn includes:

estimating the number of the bits to be transmitted in the uplink control information obtained after performing the processing on the feedback response information by using each available compression ratio in turn according to an order of the compression ratio from small to large.

In combination with the first aspect or any one of the above possible implementations, in another possible implementation of the first aspect, determining the compression ratio to be adopted includes:

determining an available compression ratio currently used for estimating the number of bits to be transmitted in the processed uplink control information according to a current number of times of estimations and a unit of the compression ratio.

In combination with the first aspect or any one of the above possible implementations, in another possible implementation of the first aspect, performing the compression processing on the CBG-based feedback response information by using the target compression ratio includes:

determining to perform the compression processing on the CBG-based feedback response information by using the target compression ratio to obtain the number of bits of the feedback response information after the compression processing which is equal to a fifth value;

wherein the fifth value is obtained by ceiling a maximum number of coding block groups which can be included in the transmission block divided by the target compression ratio.

In combination with the first aspect or any one of the above possible implementations, in another possible implementation of the first aspect, performing the processing on the CBG-based feedback response information includes:

performing a combining processing on the CBG-based feedback response information.

In combination with the first aspect or any of the above possible implementations, in another possible implementation of the first aspect, a number of valid bits of CBG-based feedback response information before a compression is greater than the fifth value.

In combination with the first aspect or any one of the above possible implementations, in another possible implementation of the first aspect, performing the compression processing on the CBG-based feedback response information includes:

performing the combining processing on adjacent valid bits in the valid bits of the CBG-based feedback response information.

In combination with the first aspect or any one of the above possible implementations, in another possible implementation of the first aspect, performing the compression processing on the CBG-based feedback response information includes:

grouping the valid bits of the CBG-based feedback response information, wherein a difference between different groups in the number of valid bits is not greater than 1;

performing the combining processing in groups.

In combination with the first aspect or any one of the above possible implementations, in another possible implementation of the first aspect, performing the processing on the CBG-based feedback response information includes:

mapping the valid bits of the CBG-based feedback response information to the processed valid bits.

In combination with the first aspect or any of the above possible implementations, in another possible implementation of the first aspect, the number of valid bits of the CBG-based feedback response information before the compression is not greater than the fifth value.

In combination with the first aspect or any one of the above possible implementations, in another possible implementation of the first aspect, performing the processing on the CBG-based feedback response information by using the target compression ratio includes:

filling the processed feedback response information with placeholder information to make a number of bits after the filling equal to the fifth value.

In combination with the first aspect or any one of the above possible implementations, in another possible implementation of the first aspect, a value of the target compression ratio is a constant or configured by a network side, wherein the target compression ratio is a ratio of the number of bits before the compression to the number of bits after the compression.

In combination with the first aspect or any one of the above possible implementations, in another possible implementation of the first aspect, the predetermined condition is:

the number of bits to be transmitted in the uplink control information is less than or equal to the first value.

In combination with the first aspect or any one of the above possible implementations, in another possible implementation of the first aspect, performing the compression processing on the uplink control information includes:

after performing the compression processing on the CBG-based feedback response information, when the number of bits of the uplink control information is greater than the first value, discarding channel state information included in the uplink control information.

In combination with the first aspect or any one of the above possible implementations, in another possible implementation of the first aspect, the first value is a maximum number of bits of the uplink control information transmitted in the target time unit.

In a second aspect, a radio communication method is provided. The method includes:

receiving uplink control information after a compression processing sent by a terminal device in a target time unit, wherein the compression processing includes a compression processing performed on CBG-based feedback response information included in the uplink control information to be transmitted;

determining feedback response information of each coding block group.

In combination with the second aspect, in one possible implementation of the second aspect, the compression processing including a compression processing performed on the CBG-based feedback response information included in the uplink control information to be transmitted, includes:

performing the compression processing on CBG-based feedback response information corresponding to a single transmission block respectively.

In combination with the second aspect or any one of the above possible implementations, in another possible implementation of the second aspect, a number of bits of the uplink control information after the compression processing is not greater than a first value.

In combination with the second aspect or any one of the above possible implementations, in another possible implementation of the second aspect, the first value is a maximum number of bits of the uplink control information transmitted in the target time unit.

In combination with the second aspect or any one of the above possible implementations, in another possible implementation of the second aspect, the compression process further includes:

after performing the compression processing on the CBG-based feedback response information, when a number of bits of first uplink control information obtained is greater than the first value, discarding channel state information included in the first uplink control information.

In a third aspect, a terminal device is provided. The terminal device is used for performing the method in the above first aspect or any possible implementation of the first aspect. Specifically, the terminal device includes function modules used for executing the method in the first aspect or any possible implementation of the first aspect described above.

In a fourth aspect, a network device is provided. The network device is used for performing the method in the above second aspect or any possible implementation of the second aspect. Specifically, the network device includes function modules for executing the method in the second aspect or in any possible implementation of the second aspect described above.

In a fifth aspect, a terminal device is provided. The terminal device includes a processor, a storage, and a transceiver. The processor, the storage, and the transceiver communicate with each other through internal connection paths to transfer control and/or data signals so that the terminal device executes the method in the first aspect or any possible implementation of the first aspect described above.

In a sixth aspect, a network device is provided. The network device includes a processor, a storage, and a transceiver. The processor, the storage, and the transceiver communicate with each other through internal connection paths to transfer control and/or data signals so that the network device executes the method in the second aspect or any possible implementation of the second aspect described above.

In a seventh aspect, a computer readable medium for storing a computer program is provided. The computer program includes instructions for executing any method or any possible implementation of the method described above.

In an eighth aspect, a computer program product containing instructions is provided. When running on a computer, the computer program product causes the computer to execute any method or any possible implementation of the method described above.

BRIEF DESCRIPTION OF DRAWINGS

To describe the technical scheme of implementations of the present disclosure more clearly, accompanying drawings that need to be used in the implementations or description for the prior art will be briefly introduced below. It is apparent that the accompanying drawings described below are only some implementations of the present disclosure; and for a person of ordinary skill in the art, other drawings may be obtained according to these drawings without paying an inventive effort.

DETAILED DESCRIPTION

The technical scheme in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solutions of the implementations of the present disclosure may be applied to various communication systems, such as, Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS) system, Worldwide Interoperability for Microwave Access (WiMAX) communication system, or a future 5G system.

Figure 1:
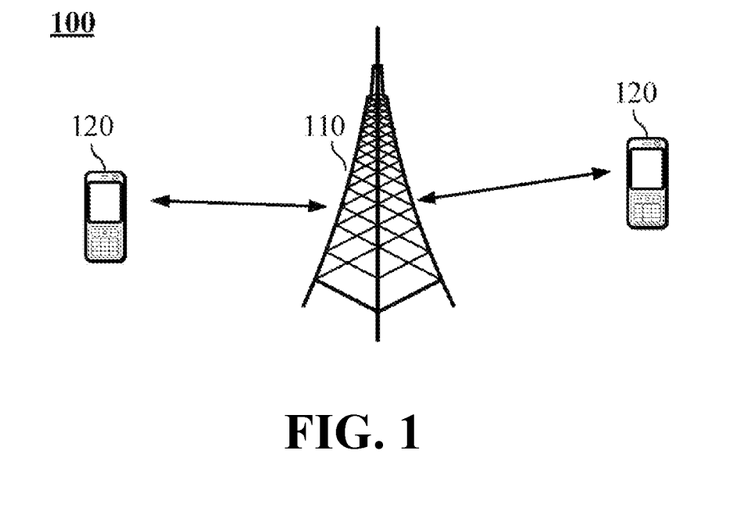
FIG. 1 is a schematic diagram of a radio communication system according to an implementation of the present disclosure.

FIG. 1 shows a radio communication system 100 applied in an implementation of the present disclosure. The radio communication system 100 may include a network device 110. The network device 100 may be a device that communicates with a terminal device. The network device 100 may provide communication coverage for a specific geographical area, and may communicate with a terminal device (e.g., UE) in the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, an on-board device, or a wearable device, a network device in a future 5G network, or a network device in a future evolved Public Land Mobile Network (PLMN), etc.

The radio communication system 100 also includes at least one terminal device 120 in the coverage area of the network device 110. The terminal device 120 may be mobile or fixed. Optionally, the terminal device 120 may be referred to as an access terminal, User Equipment (UE), a subscriber unit, a subscriber station, a mobile station, a remote station, a remote terminal, a mobile device, a user terminal, a terminal, a radio communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a radio communication function, a computing device, or other processing device connected to a wireless modem, an on-board device, a wearable device, a terminal device in a future 5G network, or a terminal device in a future evolving Public Land Mobile Network (PLMN), or the like.

Optionally, a Device to Device (D2D) communication may be performed between the terminal devices 120.

Optionally, the 5G system or network may also be referred to as a New Radio (NR) system or network.

FIG. 1 exemplifies one network device and two terminal devices. Optionally, the radio communication system 100 may include multiple network devices, and another quantity of terminal devices may be included within the coverage area of each network device, which is not restricted in implementations of the present disclosure.

Optionally, the radio communication system 100 may also include other network entities such as a network controller, a mobile management entity, and implementations of the present disclosure are not limited thereto.

It should be understood that the terms "system" and "network" are often used interchangeably in this document. The term "and/or" in this document is merely an association relationship describing an associated object, indicating that there may be three relationships, for example, a and/or b may indicate three cases: a alone, a and b, and b alone. In addition, the symbol "/" in this document generally indicates that objects before and after the symbol "/" have an "or" relationship.

Figure 2:
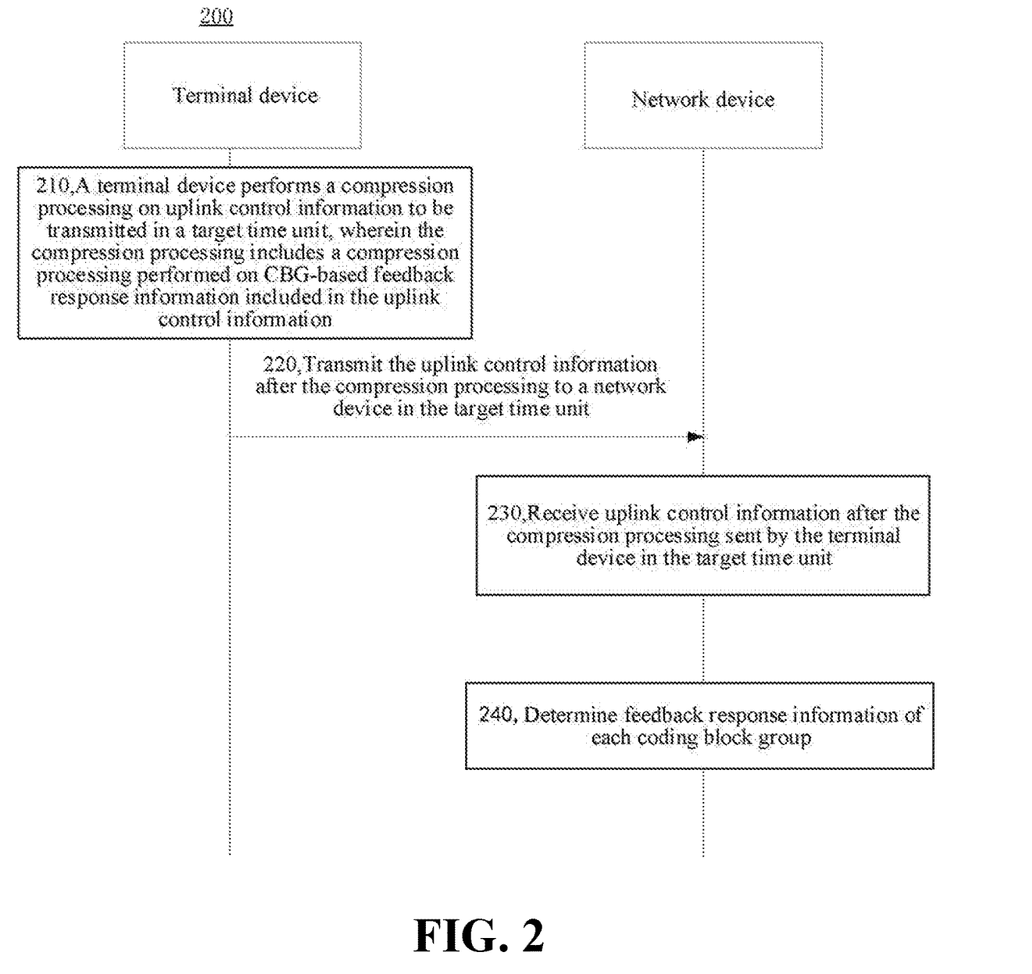
FIG. 2 is a schematic flowchart of a radio communication method according to an implementation of the present disclosure.

FIG. 2 is a schematic flowchart of a radio communication method 200 according to an implementation of the present disclosure. The method 200 may optionally be applied to the system shown in FIG. 1, but is not limited thereto. The method 200 includes at least some of the following contents.

In 210, a terminal device performs a compression processing on uplink control information to be transmitted in a target time unit, wherein the compression processing includes a compression processing performed on Coding Block Group (CBG)-based feedback response information included in the uplink control information.

Optionally, the target time unit mentioned in an implementation of the present disclosure may be a radio frame, a subframe, a time slot, a mini time slot or a symbol, etc.

It should be understood that in an implementation of the present disclosure, in addition to performing the compression processing on the CBG-based feedback response information, the compression processing performed on the uplink control information may also include other compression processing.

For example, part of the uplink control information, such as channel state information, is discarded.

For example, the uplink control information may also include coding block-based feedback response information, and the compression processing may be performed on the coding block-based feedback response information.

For example, a combining processing may be performed on feedback response information of multiple transmission blocks.

Optionally, before the terminal device performs the compression processing on the uplink control information to be transmitted in the target time unit, it is determined that the number of bits to be transmitted in the uplink control information is greater than a first value.

Optionally, in an implementation of the present disclosure, the first value may be the maximum number of bits of uplink control information transmitted in the target time unit.

The maximum number of bits may be configured by a network device for the terminal device, or may be determined by the terminal device according to its own capability.

It should be understood that the first value of the implementation of the present disclosure may also be other values, for example, X percent of the maximum number of bits of uplink control information transmitted in the target time unit, and X is less than 100, etc.

Optionally, according to the first value, the terminal device performs the compression processing on the uplink control information, so that the number of bits to be transmitted in the uplink control information after the compression processing is less than or equal to the first value.

Optionally, the terminal device performs the compression processing on CBG-based feedback response information corresponding to a single transmission block respectively.

Specifically, the terminal device may perform the compression processing in transmission blocks, for example, a combining processing is performed on valid bits of CBG-based feedback response information included in each transmission block, or a smaller amount of placeholder information is added to feedback response information corresponding to a single transmission block, etc.

Optionally, the compression processing is performed on CBG-based feedback response information corresponding to different transmission blocks by using a same compression mode, and the same compression mode includes a same compression ratio and/or same compression times.

Specifically, the terminal device performs the same processing on the CBG-based feedback response information corresponding to each transmission block. Specifically, the same number of compressions may be performed, or the compression may be performed by using the same compression ratio, and the like.

Optionally, the compression processing is performed on the CBG-based feedback response information corresponding to the single transmission block in turn according to a compression priority of the single transmission block.

The compression priority may indicate an order by which the corresponding transmission blocks are compressed.

Specifically, the single transmission block with the highest compression priority may be compressed so that the number of bits occupied by the single transmission block after the compression reaches the minimum number of bits. If the current number of bits to be transmitted of the uplink control information is less than or equal to the first value after the single transmission block is compressed, the compression of the uplink control information is stopped. If the current number of bits to be transmitted in the uplink control information is greater than the first value, the CBG-based feedback response information corresponding to the transmission block with a secondary compression priority is compressed, and so on.

Or, all transmission blocks may be compressed in a first round in turn according to the compression priorities. If the current number of bits to be transmitted of the uplink control information is less than or equal to the first value after the first round of compression, the compression of the uplink control information is stopped. If the number of current bits to be transmitted in the uplink control information is greater than the first value, a next round of compression is performed. In a process of each round of compression, if only the CBG-based feedback response information corresponding to part of the transmission blocks is compressed, as a result, the current number of bits to be transmitted in the uplink control information may be less than or equal to the first value, then the compression of the uplink control information also is stopped.

To understand the present disclosure more clearly, the compression manner of implementations of the application will be described in detail below in combination with the two realization modes, mode A and mode B. It should be understood that the following mode A is applicable to a scene where a compression processing is performed on the CBG-based feedback response information corresponding to all transmission blocks in the same compression mode. The following mode A is also applicable to a scene where the compression processing is performed on the CBG-based feedback response information corresponding to the single transmission block in turn according to the compression priority of the single transmission block.

Mode A

In mode A, performing the compression processing on the CBG-based feedback response information corresponding to the single transmission block respectively includes: at least one processing is performed on the CBG-based feedback response information in turn till a predetermined condition is satisfied, wherein information used in an (M+1)th processing is feedback response information after an Mth processing, and the M is an integer greater than or equal to 0.

Optionally, the predetermined condition is that the number of bits to be transmitted in the uplink control information is less than or equal to a first value.

Optionally, the processing of the mode A may aim at all transmission blocks, that is, at least one compression processing is performed on the CBG-based feedback response information corresponding to each transmission block. Herein, the numbers of the compressions for different transmission blocks may be the same or different.

Optionally, the processing of the mode A may aim at part of the transmission blocks, that is, at least one compression processing is performed on the CBG-based feedback response information corresponding to part of the transmission blocks. Herein, the number of the compressions for different transmission blocks may be the same or different.

Optionally, the (M+1)th processing is performed on the feedback response information after the Mth processing so that the number of bits of the feedback response information after the (M+1)th processing is less than or equal to a second value.

Optionally, the second value mentioned in the implementation of the present disclosure may be related to all compression ratios from the 0th compression processing to (M+1)th compression processing and the maximum number of coding block groups which may be included in the transmission block.

In an implementation, the second value is obtained by ceiling the maximum number of coding block groups which can be included in the transmission block divided by a third value, wherein the third value is equal to the value obtained by multiplying a first compression ratio adopted in the (M+1)th processing by a second compression ratio adopted previously.

In an implementation, the second value is obtained by ceiling the number of bits corresponding to the multiple coding block groups before the (M+1)th processing divided by a third compression ratio.

In an implementation, the second value is obtained by ceiling the maximum number of coding block groups which can be included in the transmission block divided by a fourth value, wherein the fourth value is an (M+1)th power of a fourth compression ratio.

Optionally, the compression ratio in the implementation of the present disclosure is a ratio of the number of bits before a compression to the number of bits after the compression.

However, implementations of the present disclosure are not limited thereto, and a compression ratio of the present disclosure may also be a ratio of the number of bits after a compression to the number of bits before the compression.

Optionally, the value of the first compression ratio, the value of the second compression ratio, the value of the third compression ratio, or the value of the fourth compression ratio is a constant or configured by a network side.

Optionally, the (M+1)th processing is performed by using the feedback response information after the Mth processing, wherein the (M+1)th processing includes performing a combining processing on valid bits of the feedback response information after the Mth processing to obtain valid bits of the feedback response information after the (M+1)th processing.

Specifically, after the terminal device performs the Mth compression processing, if the number of valid bits obtained after the Mth compression processing is greater than the second value, it means that valid bits obtained after the Mth compression processing need to be combined, wherein the combining processing mentioned in the implementation of the present disclosure may be a logical addition processing of bits, or the like.

Optionally, the combining processing is performed on adjacent valid bits in the valid bits of the feedback response information after the Mth processing to obtain the valid bits of the feedback response information after the (M+1)th processing.

Specifically, the combining processing may be performed on adjacent valid bits according to the compression ratio adopted in the (M+1)th compression processing. For example, if the compression ratio adopted in the (M+1)th compression processing is 3 and the number of valid bits obtained after the Mth compression processing is 7, the combining processing may be performed on the 1st, 2nd and 3rd bits, and the combining processing may be performed on the 4th, 5th and 6th bits, and the 7th bit may be kept unchanged, so as to obtain 3 valid bits. Or the combining processing may be performed on the 1st, 2nd and 3rd bits, the combining processing may be performed on the 4th and 5th bits, and the combining processing may be performed on the 6th and 7th bits.

Optionally, the valid bits of the feedback response information after the Mth processing are grouped according to a compression ratio of the (M+1)th processing, wherein a difference between different groups in the number of valid bits is not greater than 1. A combining processing is performed in groups. When grouping, adjacent bits may be put into one group.

Specifically, adjacent valid bits may be grouped according to the compression ratio adopted in the (M+1)th compression processing. For example, if the compression ratio adopted in the (M+1)th compression processing is 3 and the number of valid bits obtained after the Mth compression processing is 7, the 1st, 2nd and 3rd bits may be put into one group, the 4th and 5th bits into one group, and the 6th and 7th bits into one group.

In this case, a difference between different groups in the number of valid bits is not greater than 1, which can make the grouping as uniform as possible and make a validation rate of the information higher.

Optionally, the terminal device performs the (M+1)th processing by using the feedback response information after the Mth processing, wherein valid bits in the feedback response information after the Mth processing are mapped to the valid bits in the feedback response information after the (M+1)th processing.

Specifically, when the number of valid bits of the feedback response information after the Mth processing is not greater than the second value, it means that there is no need to perform the combining processing on the valid bits during the (M+1)th processing. At this time, the valid bits in the feedback response information after the Mth processing may be directly used as valid bits in the feedback response information after the (M+1)th processing.

Optionally, after performing at least one processing on the CBG-based feedback response information, when the current number of bits to be transmitted in the uplink control information is less than or equal to the second value, the feedback response information is filled with placeholder information so that the number of bits of the filled feedback response information is equal to the second value.

Specifically, after performing all of the at least one processing on the CBG-based feedback response information, if the current number of bits to be transmitted in the uplink control information is less than or equal to a second value, the feedback response information may be filled with placeholder information so that the number of bits of the filled feedback response information is equal to the second value.

The second value mentioned here may be related to all compression ratios used in the at least one compression processing and the maximum number of coding block groups which can be included in the transmission block.

In an implementation, the second value is obtained by ceiling the maximum number of coding block groups which can be included in the transmission block divided by a third value, wherein the third value is equal to the value obtained by multiplying a first compression ratio adopted in the last processing by a second compression ratio adopted previously.

In an implementation, the second value is obtained by ceiling the number of bits corresponding to the multiple coding block groups before the last processing divided by a third compression ratio.

In an implementation, the second value is obtained by ceiling the maximum number of coding block groups which can be included in the transmission block divided by a fourth value, wherein the fourth value is an Rth power of a fourth compression ratio, the R is the number of all compressions.

To understand the present disclosure more clearly, the mode A according to an implementation of the present disclosure will be described in detail below in combination with examples.

Specifically, the terminal device determines the number P of actually scheduled coding block groups in a transmission block, P is not greater than Q, and Q is the maximum number of coding block groups included in the transmission block.

In act 1), the terminal respectively performs the following processing for multiple CBG-level feedback-based transmission blocks.

In 1.1), if P is not greater than $\lceil Q/2 \rceil$, and Q=1, 2, 4, 6 or 8, a combining processing is not performed on the P-bit feedback information corresponding to the transmission block.

In 1.2), if P is greater than $\lceil Q/2 \rceil$, a combining processing is performed on the P-bit valid feedback information corresponding to the transmission block. The adjacent 2 bits in the P-bit feedback response information are combined to obtain $\lceil P/2 \rceil$-bit information, for example, P=5, bit 1 and bit 2 are combined, bit 3 and bit 4 are combined, and bit 5 is kept unchanged.

After the act 1), a range of the numbers of feedback response information bits corresponding to one transmission block may be {1, 2, 3, 4}.

After the terminal device respectively performs the processing in the act 1) above for multiple transmission blocks, if the total number of bits to be transmitted in the uplink control information (assuming plus the number of bits of placeholder information, wherein the number of bits of the placeholder information is $\lceil Q/2 \rceil - \lceil P/2 \rceil$) is not greater than the maximum number of bits, then all the obtained uplink control information is transmitted. Otherwise, the act 2 is executed.

In act 2), the terminal respectively performs the following processing for multiple CBG-level feedback-based transmission blocks.

In 2.1), if P1 is not greater than $\lceil Q/4 \rceil$, Q=1, 2, 4, 6 or 8, the P1-bit feedback information is not compressed, and bit mapping is directly performed, wherein P1 may be equal to P or $\lceil P/2 \rceil$.

In 2.2), if P1 is greater than $\lceil Q/4 \rceil$, a combining processing is performed on P1-bit information. Adjacent 2 bits in the P1-bit information are combined to obtain $\lceil P1/2 \rceil$-bit information. For example, P1=3, then bit 1 and bit 2 are combined, and bit 3 remains unchanged.

After the act 2), a range of the numbers of feedback response information bits corresponding to one transmission block may be {1, 2}.

After the terminal device respectively performs the processing in the act 2) above for multiple transmission blocks, if the total number of bits to be transmitted in the uplink control information (assuming plus the number of bits of placeholder information, wherein the number of bits of the placeholder information is $\lceil Q/4 \rceil - \lceil P/4 \rceil$) is not greater than the maximum number of bits, then all the obtained uplink control information is transmitted. Otherwise, act 3 is executed.

In act 3), the terminal respectively performs the following processing for multiple CBG-level feedback-based transmission blocks.

In 3.1), if P2 is not greater than $\lceil Q/8 \rceil$, Q=1, 2, 4, 6 or 8, the P2-bit feedback information is not compressed, and bit mapping is directly performed, wherein P2 may be equal to P1 or $\lceil P1/2 \rceil$, to obtain $\lceil Q/8 \rceil$=1-bit information corresponding to the transmission block.

In 3.2), if P2 is greater than $\lceil Q/8 \rceil$, a combining processing is performed on P2-bit information. Adjacent 2 bits in the P2-bit information are combined to obtain $\lceil P2/2 \rceil$-bit information.

Optionally, after performing the compression processing on the CBG-based feedback response information, when the number of bits of the uplink control information is greater than a first value, channel state information included in the uplink control information is discarded.

Mode B

In mode B, the terminal device performs a processing on the CBG-based feedback response information by using a target compression ratio. Herein, after performing the processing on the CBG-based feedback response information by using the target compression ratio, a predetermined condition is satisfied.

Specifically, the terminal device may determine a target compression ratio, wherein after the CBG-based feedback response information is processed using the target compression ratio, a predetermined condition is satisfied. The CBG-based feedback response information of one or more transmission blocks is processed based on the target compression ratio.

Optionally, the predetermined condition is that the number of bits to be transmitted in the uplink control information is less than or equal to a first value.

Optionally, the processing of the mode B may aim at all transmission blocks, that is, a compression processing is performed on the CBG-based feedback response information corresponding to each transmission block. Herein, the target compression ratios adopted by different transmission blocks for performing the compression processing may be the same or different.

Optionally, the processing of the mode B may aim at part of the transmission blocks, that is, the compression processing is performed on the CBG-based feedback response information corresponding to the part of the transmission blocks. Herein, the compression ratios of different transmission blocks for performing the processing may be the same or different.

Optionally, the number of bits to be transmitted in the uplink control information obtained after performing the processing on the feedback response information is estimated by using each available compression ratio in turn till the predetermined condition is satisfied. The compression ratio used when the predetermined condition is satisfied is determined as the target compression ratio.

Optionally, the number of bits to be transmitted in the uplink control information obtained after performing the processing on the feedback response information is estimated by using each available compression ratio in turn according to an order of the compression ratio from small to large.

Optionally, an available compression ratio currently used for estimating the number of bits to be transmitted in the processed uplink control information is determined according to a unit of the compression ratio and a current number of times of estimations.

Optionally, it is determined to perform the compression processing on the CBG-based feedback response information by using the target compression ratio to obtain the number of bits of the compressed feedback response information which is equal to a fifth value.

Optionally, in an implementation of the present disclosure, the fifth value is obtained by ceiling the maximum number of coding block groups which can be included in the transmission block divided by the target compression ratio.

Optionally, a combining processing is performed on the CBG-based feedback response information.

Specifically, when the number of valid bits of the CBG-based feedback response information before the compression is greater than the fifth value, it means that a combining processing needs to be performed on the valid bits of the feedback response information, and at this time, the combining processing may be performed on the valid bits of the feedback response information according to the target compression ratio.

Optionally, the combining processing is performed on adjacent valid bits in the valid bits of the CBG-based feedback response information.

Specifically, the combining processing may be performed on adjacent valid bits according to the target compression ratio. For example, if the target compression ratio is 3 and the number of valid bits obtained after the Mth compression processing is 7, the combining processing may be performed on the 1st, 2nd and 3rd bits, and the combining processing may be performed on the 4th, 5th and 6th bits, and the 7th bit may be kept unchanged, so as to obtain 3 valid bits. Or the combining processing may be performed on the 1st, 2nd and 3rd bits, the combining processing may be performed on the 4th and 5th bits, and the combining processing may be performed on the 6th and 7th bits.

Optionally, the valid bits of the CBG-based feedback response information are grouped, wherein a difference between different groups in the number of valid bits is not greater than 1. A combining processing is performed in groups. When grouping, adjacent bits may be put into one group.

Specifically, adjacent valid bits may be grouped according to the target compression ratio. For example, if the compression ratio adopted in the (M+1)th compression processing is 3 and the number of valid bits obtained after the Mth compression processing is 7, the 1st, 2nd and 3rd bits may be put into one group, the 4th and 5th bits into one group, and the 6th and 7th bits into one group.

In this case, a difference between different groups in the number of valid bits is not greater than 1, which can make the grouping as uniform as possible and make an effective rate of the information higher.

Optionally, the valid bits of the CBG-based feedback response information are mapped to the processed valid bits.

Specifically, when the number of valid bits of the CBG-based feedback response information before the compression is not greater than the fifth value, it means that a combining processing does not need to be performed on the valid bits. At this time, the valid bits in the feedback response information before the processing may be directly used as the valid bits in the feedback response information after the processing.

Optionally, the processed feedback response information is filled with placeholder information so that the number of bits after the filling is equal to the fifth value.

Specifically, after performing the processing on the CBG-based feedback response information, if the current number of bits to be transmitted in the uplink control information is less than or equal to the fifth value, the feedback response information may be filled with placeholder information so that the number of bits of the filled feedback response information is equal to the fifth value.

Optionally, the value of the target compression ratio is a constant or configured by the network side, wherein the target compression ratio is a ratio of the number of bits before compression to the number of bits after the compression.

To understand the present disclosure more clearly, the mode B according to an implementation of the present disclosure will be described in detail below in combination with examples.

Specifically, the terminal device determines the number P of actually scheduled coding block groups in a transmission block, P is not greater than Q, and Q is the maximum number of coding block groups included in the transmission block.

In act 1), the terminal device respectively calculates the corresponding $O=\lceil Q/2 \rceil$ for each CBG-level feedback-based transmission block as the number of feedback response information bits corresponding to the transmission block, to determine whether the total number of bits of all uplink control information is greater than the maximum number of bits, wherein Q=1, 2, 4, 6 or 8. If the total number of bits of all uplink control information is not greater than the maximum number of bits, act 2) is executed, if the total number of bits of all uplink control information is greater than the maximum number of bits, act 3) is executed.

In act 2), the terminal respectively performs the following processing for multiple CBG-level feedback-based transmission blocks.

In 2.1), if P is not greater than $O=\lceil Q/2 \rceil$, the P-bit feedback information corresponding to the transmission block is not compressed. $\lceil Q/2 \rceil - P$-bit Placeholder information is used after the P bits to obtain $O=\lceil Q/2 \rceil$-bit information corresponding to the transmission block.

In 2.2), if P is greater than $O=\lceil Q/2 \rceil$, a combining processing is performed on the P-bit feedback information corresponding to the transmission block. A combining processing is performed on the adjacent 2 bits of feedback response information in the P-bit information to obtain $\lceil P/2 \rceil$-bit information. For example, P=5, bit 1 and bit 2 are combined, bit 3 and bit 4 are combined, and bit 5 keeps unchanged. $\lceil Q/2 \rceil - \lceil P/2 \rceil$-bit Placeholder information is used after the $\lfloor P/2 \rfloor$ bits to obtain $\lfloor Q/2 \rfloor$-bit information corresponding to the transmission block.

In act 3), the terminal device respectively calculates the corresponding $O=\lceil Q/4 \rceil$ for each CBG-level feedback-based transmission block as the number of feedback response information bits corresponding to the transmission block, to determine whether the total number of bits of all uplink control information is greater than the maximum number of bits, wherein Q=1, 2, 4, 6 or 8. If the total number of bits of all uplink control information is not greater than the maximum number of bits, act 4) is executed, if the total number of bits of all uplink control information is greater than the maximum number of bits, act 5) is executed.

In 4.1), if P is not greater than $O=\lceil Q/4 \rceil$, the P-bit feedback information corresponding to the transmission block is not compressed. $\lceil Q/4 \rceil - P$-bit Placeholder information is used after the P bits to obtain $O=\lceil Q/4 \rceil$-bit information corresponding to the transmission block.

In 4.2), if P is greater than $O=\lceil Q/4 \rceil$, a combining processing is performed on the P-bit feedback information corresponding to the transmission block. The P bits are divided into R groups (if the maximum of Q is equal to 8, then R=1 or 2), wherein the bits in each group are adjacent bits, wherein the number of bits in the first $\lceil P/R \rceil \times R-P$ group is $\lfloor P/R \rfloor$, and the number of bits in the last $\lceil P/R \rceil \times R-P$ group is $\lceil P/R \rceil$. The bit information in each group is combined to obtain $R=\lceil Q/4 \rceil$-bit information, for example, P=5, Q=8, R=2, $\lceil P/R \rceil \times R-P=1$ group contains 2 bits, and $\lceil P/R \rceil \times R-P=1$ group contains 3 bits.

In act 5), the terminal calculates the corresponding $S=\lceil Q/8 \rceil$ for each CBG-level feedback-based transmission block respectively.

In 5.1), if P is not greater than $S=\lceil Q/8 \rceil=1$, the P-bit feedback information corresponding to the transmission block is not compressed. $S=\lceil Q/8 \rceil=1$-bit information corresponding to the transmission block is obtained.

In 5.2), if P is greater than $S=\lceil Q/8 \rceil$, a combining processing is performed on all-bit feedback information corresponding to the transmission block. $S=\lceil Q/8 \rceil=1$ bit information is obtained.

Optionally, after performing the compression processing on the CBG-based feedback response information, when the number of bits of the uplink control information is greater than the first value, channel state information included in the uplink control information is discarded.

In 220, the terminal device transmits the uplink control information after the compression processing to a network device in the target time unit.

In 230, the network device receives the uplink control information after the compression processing sent by the terminal device in the target time unit, wherein the compression processing includes a compression processing performed on the CBG-based feedback response information included in the uplink control information to be transmitted.

In 240, the network device determines feedback response information of each coding block group.

Specifically, the network device may determine feedback response information of each coding block group from the uplink control information after the compression processing. At least one coding block group corresponding to each valid bit in the feedback response information corresponding to a single transmission block is determined. Feedback response information of the at least one coding block group is determined from valid bits corresponding to the at least one coding block group.

Optionally, at least one coding block group corresponding to each valid bit is determined according to the mode by which the terminal device performs the compression processing on the CBG-based feedback response information.

Optionally, the compression processing mode is used to indicate a mode of combining valid bit bits and/or a compression ratio used for the compression.

Therefore, a compression processing is performed on uplink control information to be transmitted in a target time unit, wherein the compression processing includes a compression processing performed on the CBG-based feedback response information included in the uplink control information, which can reduce the number of bits of the uplink control information, avoid a case where the number of bits of the uplink control information is greater than the maximum number of bits which can be transmitted by the terminal device in the time unit, increase an uplink coverage radius, and reduce the probability of limiting the transmission power of the terminal device.

Figure 3:
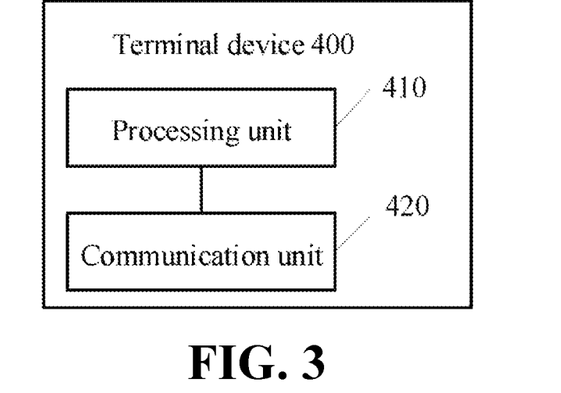
FIG. 3 is a schematic block diagram of a terminal device according to an implementation of the present disclosure.

FIG. 3 is a schematic block diagram of a terminal device 400 according to an implementation of the present disclosure. As shown in FIG. 3, the terminal device 400 includes a processing unit 410 and a communication unit 420.

The processing unit 410 is used for performing a compression processing on uplink control information to be transmitted in a target time unit, wherein the compression processing includes a compression processing performed on CBG-based feedback response information included in the uplink control information.

The communication unit is used for transmitting the uplink control information after the compression processing in the target time unit.

It should be understood that the terminal device 400 may correspond to the terminal device in the method implementations and may implement corresponding operations implemented by the terminal device in the method implementations. For sake of conciseness, it will not be repeated here.

Figure 4:
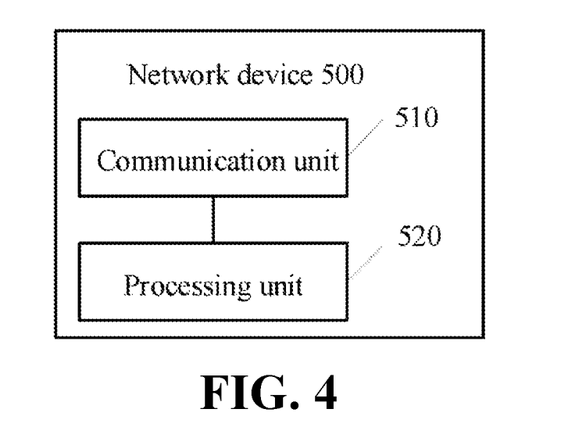
FIG. 4 is a schematic block diagram of a network device according to an implementation of the present disclosure.

FIG. 4 is a schematic block diagram of a network device 500 according to an implementation of the present disclosure. As shown in FIG. 4, the network device 500 includes a communication unit 510 and a processing unit 520. The communication unit 510 is used for receiving uplink control information after a compression processing sent by a terminal device in a target time unit, wherein the compression processing includes a compression processing performed on CBG-based feedback response information included in uplink control information to be transmitted. The processing unit 520 is used for determining feedback response information of each coding block group.

It should be understood that the network device 500 may correspond to the network device in the method implementations and may implement corresponding operations implemented by the network device in the method implementations. For sake of conciseness, it will not be repeated here.

Figure 5:
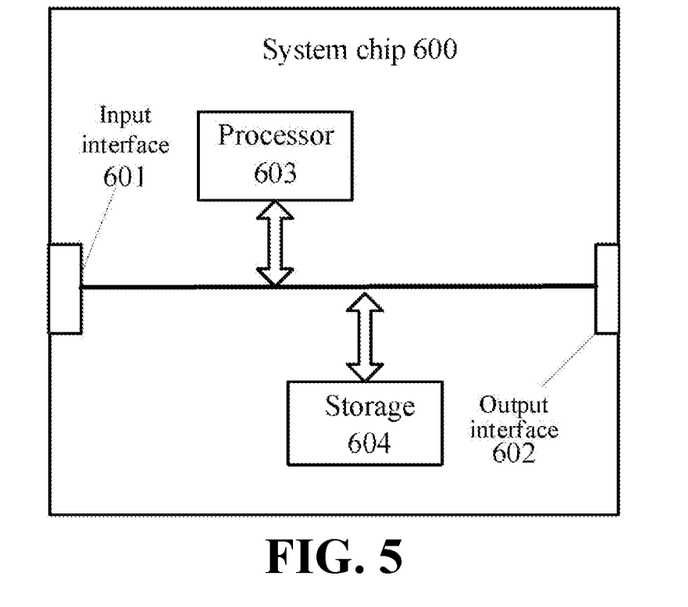
FIG. 5 is a schematic diagram of a system chip according to an implementation of the present disclosure.

FIG. 5 is a schematic structural diagram of a system chip 600 according to an implementation of the present disclosure. The system chip 600 of FIG. 5 includes an input interface 601, an output interface 602, a processor 603, and a storage 604. The input interface 601, the output interface 602, the processor 603, and the storage 604 are connected through internal communication connection lines. The processor 603 is used for executing codes in the storage 604.

Optionally, when the code is executed, the processor 603 implements the method implemented by the network device in the method implementations. For sake of conciseness, it will not be repeated here.

Optionally, when the code is executed, the processor 603 implements the method implemented by the terminal device in the method implementations. For sake of conciseness, it will not be repeated here.

Figure 6:
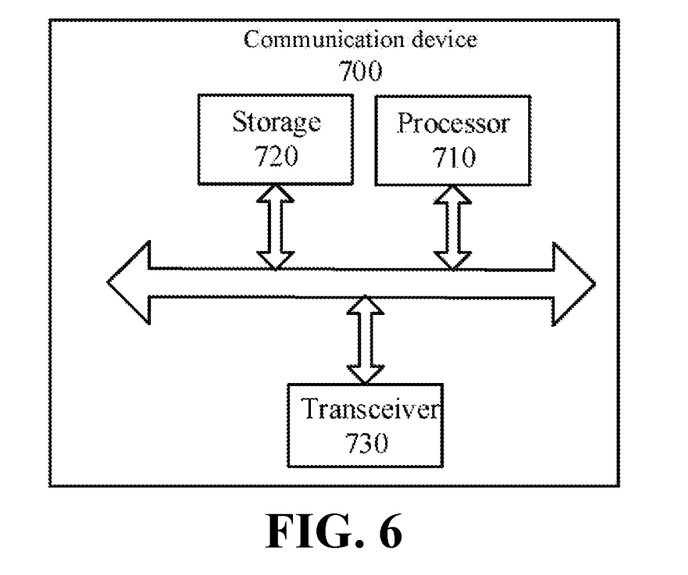
FIG. 6 is a schematic block diagram of a communication device according to an implementation of the present disclosure.

FIG. 6 is a schematic block diagram of a communication device 700 according to an implementation of the present disclosure. As shown in FIG. 6, the communication device 700 include a processor 710 and a storage 720. The storage 720 may store program codes, and the processor 710 may execute the program codes stored in the storage 720.

Optionally, as shown in FIG. 6, the communication device 700 may include a transceiver 730, and the processor 710 may control the transceiver 730 to communicate with the external.

Optionally, the processor 710 may call the program codes stored in the storage 720 to perform corresponding operations of the network device in the method implementations, which will not be repeated here for sake of conciseness.

Optionally, the processor 710 may call the program codes stored in the storage 720 to perform corresponding operations of the terminal device in the method implementations, which will not repeated here for sake of conciseness.

It should be understood that the processor in an implementation of the present disclosure may be an integrated circuit chip with a capability for processing signals. In the realization process, the acts of the method implementations described above may be accomplished by integrated logic circuits of hardware in the processor or instructions in the form of software. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present disclosure. The general purpose processor may be a microprocessor or the processor may be any conventional processor or the like. The acts of the method disclosed in connection with the implementation of the present disclosure may be directly embodied by the execution of the hardware decoding processor, or by the execution of a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and accomplishes the acts of the above method in combination with its hardware.

It should be understood that the storage in implementations of the present disclosure may be a transitory memory or non-transitory memory, or may include both transitory memory and non-transitory memory. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

Those of ordinary skill in the art will recognize that the exemplary elements and algorithm acts described in connection with the implementations disclosed herein can be implemented in electronic hardware, or a combination of computer software and electronic hardware. Whether these functions are performed in hardware or software depends on the specific application and design constraints of the technical solution. Skilled in the art may use different methods to realize the described functions for each particular application, but such realization should not be considered to be beyond the scope of the present disclosure.

Those skilled in the art can clearly understand that for convenience and conciseness of description, corresponding processes in the aforementioned method implementations may be referred to for the specific working processes of the system, device, and unit described above, which are not repeated here.

In several implementations provided by the present disclosure, it should be understood that the disclosed system, apparatus and method may be implemented in other ways. The apparatus implementations described above are only illustrative, for example, the division of the units is only a logical function division, and there may be other division manners in actual realization. For example, multiple units or components may be combined or integrated into another system, or some features may be ignored or not executed. In addition, the mutual coupling or direct coupling or communication connection shown or discussed may be indirect coupling or communication connection through some interface, apparatus or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical needs to achieve a purpose of the implementations.

In addition, various functional units in various implementations of the present disclosure may be integrated in one processing unit, or various units may be physically present separately, or two or more units may be integrated in one unit.

The function may be stored in a computer readable storage medium if implemented in a form of software functional unit and sold or used as a separate product. Based on this understanding, the technical solution of the implementation of the present disclosure, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage media include various media capable of storing program codes, such as a U disk, a mobile hard disk, ROM, RAM, a magnetic disk or an optical disk.

The foregoing are merely exemplary implementations of the present disclosure, but the protection scope of the present disclosure is not limited thereto. Any person skilled in the art can easily conceive changes or substitutions within the technical scope disclosed by the present disclosure, which should be included within the protection scope of the present disclosure. Therefore, the protection scope of the present disclosure should be subject to the protection scope of the claims.

What is claimed is:

1. A radio communication method, comprising:
    performing a compression processing on uplink control information to be transmitted in a target time unit, wherein the compression processing comprises a compression processing performed on Coding Block Group (CBG)-based feedback response information comprised in the uplink control information; and
    transmitting the uplink control information after the compression processing in the target time unit,
    wherein performing the compression processing on the uplink control information comprises:
        performing the compression processing on CBG-based feedback response information corresponding to a single transmission block respectively,
    wherein performing the compression processing on the CBG-based feedback response information corresponding to the single transmission block respectively comprises:

performing a processing on the CBG-based feedback response information by using a target compression ratio, wherein after performing the processing on the CBG-based feedback response information by using the target compression ratio, a predetermined condition is satisfied, wherein performing the compression processing on the CBG-based feedback response information corresponding to the single transmission block respectively comprises:

estimating a number of bits to be transmitted in the uplink control information obtained after performing the processing on the feedback response information by using each available compression ratio in turn till the predetermined condition is satisfied; and determining the compression ratio adopted when the predetermined condition is satisfied as the target compression ratio.

2. The method of claim 1, wherein performing the compression processing on the CBG-based feedback response information corresponding to the single transmission block respectively comprises:

performing the compression processing on CBG-based feedback response information corresponding to different transmission blocks by using a same compression mode, wherein the same compression mode comprises a same compression ratio, or same compression times, or a same compression ratio and same compression times.

3. The method of claim 1, wherein performing the compression processing on the CBG-based feedback response information corresponding to the single transmission block respectively comprises:

performing the compression processing on the CBG-based feedback response information corresponding to the single transmission block in turn according to a compression priority of the single transmission block.

4. The method of claim 1, wherein performing the compression processing on the CBG-based feedback response information corresponding to the single transmission block respectively comprises:

performing at least one processing on the CBG-based feedback response information in turn till a predetermined condition is satisfied, wherein information used in an (M+1)th processing is feedback response information after an Mth processing, and the M is an integer greater than or equal to 0.

5. A terminal device comprising a processor and a transceiver; wherein, the processor is used for performing a compression processing on uplink control information to be transmitted in a target time unit, wherein the compression processing comprises a compression processing performed on Coding Block Group (CBG)-based feedback response information comprised in the uplink control information;

the transceiver is used for transmitting the uplink control information after the compression processing in the target time unit;

the processor is further used for performing the compression processing on CBG-based feedback response information corresponding to a single transmission block respectively;

the processor is further used for performing a processing on the CBG-based feedback response information by using a target compression ratio, wherein a predetermined condition is satisfied after performing the processing on the CBG-based feedback response information by using the target compression ratio; and the processor is further used for estimating a number of bits to be transmitted in the uplink control information obtained after performing the processing on the feedback response information by using each available compression ratio in turn till the predetermined condition is satisfied, and determining the compression ratio adopted when the predetermined condition is satisfied as the target compression ratio.

6. The device of claim 5, wherein the processor is further used for:

performing the compression processing on CBG-based feedback response information corresponding to different transmission blocks by using a same compression mode, wherein the same compression mode comprises a same compression ratio, or same compression times, or a same compression ratio and same compression times.

7. The device of claim 5, wherein the processor is further used for:

performing the compression processing on the CBG-based feedback response information corresponding to the single transmission block in turn according to a compression priority of the single transmission block.

8. The device of claim 5, wherein the processor is further used for:

performing at least one processing on the CBG-based feedback response information in turn till a predetermined condition is satisfied, wherein information used in an (M+1)th processing is feedback response information after an Mth processing, and the M is an integer greater than or equal to 0.

9. The device of claim 8, wherein the processor is further used for:

performing combining processing on adjacent valid bits in valid bits of the feedback response information after the Mth processing to obtain the valid bits of the feedback response information after the (M+1)th processing.

10. The device of claim 9, wherein the processor is further used for:

grouping the valid bits of the feedback response information after the Mth processing according to a compression ratio of the (M+1)th processing, wherein a difference between different groups in the number of valid bits is not greater than 1;

performing the combining processing in groups.

11. The device of claim 8, wherein the processor is further used for:

after performing at least one processing on the CBG-based feedback response information, when a current number of bits to be transmitted in the uplink control information is less than or equal to a second value, filling the feedback response information with placeholder information to make a number of bits of the filled feedback response information equal to the second value.

12. The device of claim 5, wherein the processor is further used for:

estimating the number of the bits to be transmitted in the uplink control information obtained after performing the processing on the feedback response information by using each available compression ratio in turn according to an order of the compression ratio from small to large.

13. The device of claim 5, wherein the processor is further used for:

determining an available compression ratio currently used for estimating the number of bits to be transmitted in the processed uplink control information according to a current number of times of estimations and a unit of the compression ratio.

14. The device of claim 5, wherein the processor is further used for:
filling the processed feedback response information with placeholder information to make a number of bits after the filling equal to a fifth value.

* * * * *